(12) United States Patent
Visintainer et al.

(10) Patent No.: US 10,683,016 B2
(45) Date of Patent: Jun. 16, 2020

(54) ASSISTING A MOTOR VEHICLE DRIVER IN NEGOTIATING A ROUNDABOUT

(71) Applicant: C.R.F SOCIETÀ CONSORTILE PER AZIONI, Orbassano (IT)

(72) Inventors: Filippo Visintainer, Orbassano (IT); Luciano Altomare, Orbassano (IT); Alessandro Marchetto, Orbassano (IT)

(73) Assignee: C.R.F. SOCIETÀ CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 16/060,741

(22) PCT Filed: Dec. 12, 2016

(86) PCT No.: PCT/IB2016/057546
§ 371 (c)(1),
(2) Date: Jun. 8, 2018

(87) PCT Pub. No.: WO2017/098486
PCT Pub. Date: Jun. 15, 2017

(65) Prior Publication Data
US 2019/0001993 A1    Jan. 3, 2019

(30) Foreign Application Priority Data

Dec. 11, 2015    (EP) ..................... 15199674

(51) Int. Cl.
*B60W 50/14*    (2020.01)
*B60W 30/095*    (2012.01)
(Continued)

(52) U.S. Cl.
CPC ........ *B60W 50/14* (2013.01); *B60W 30/0953* (2013.01); *G01C 21/30* (2013.01);
(Continued)

(58) Field of Classification Search
CPC ............ B60W 30/0953; B60W 50/14; B60W 2550/14; B60W 2550/141; B60W 2550/408; G01C 21/30; G08G 1/163
(Continued)

(56) References Cited

U.S. PATENT DOCUMENTS 7,860,639 B2 * 12/2010 Yang ..................... G08G 1/081
340/901
9,534,910 B2 * 1/2017 Okumura ........... G08G 1/09626
(Continued)

FOREIGN PATENT DOCUMENTS

DE    102012208988    12/2012
JP    H04290200    10/1992

OTHER PUBLICATIONS

International Searching Authority International Search Report and Written Opinion dated Apr. 4, 2017, for International Application No. PCT/IB16/57546, Applicant, C.R.F. Società Consortile Per Azioni (15 pages).
(Continued)

*Primary Examiner* — Atul Trivedi
(74) *Attorney, Agent, or Firm* — McCracken & Gillen LLC

(57) ABSTRACT

An advanced driver assistance system designed to receive and process motor-vehicle position-related data and motor-vehicle motion-related data of a host motor vehicle and of neighbour motor vehicles detected in the vicinity of the host motor vehicle and which have been determined as entering the same roundabout in which the host motor vehicle will enter, to provide assistance to the driver of the host motor vehicle for negotiating the roundabout. A degree of proximity of the host motor vehicle and the neighbour motor
(Continued)

vehicle to the roundabout based on motor-vehicle position-related data is determined and a determined alert level is provided the driver.

9 Claims, 11 Drawing Sheets

(51) Int. Cl.
   *G01C 21/30* (2006.01)
   *G08G 1/16* (2006.01)
(52) U.S. Cl.
   CPC ......... *G08G 1/163* (2013.01); *B60W 2552/00* (2020.02); *B60W 2552/05* (2020.02); *B60W 2556/65* (2020.02)
(58) Field of Classification Search
   USPC ........................................................ 701/117
   See application file for complete search history.

(56) References Cited

U.S. PATENT DOCUMENTS

| | | | | |
|---|---|---|---|---|
| 9,625,266 | B1* | 4/2017 | Chintakindi | G01C 21/3691 |
| 10,399,564 | B2* | 9/2019 | MacNeille | G08G 1/163 |
| 2007/0276596 | A1* | 11/2007 | Solomon | G01C 21/3632 |
| | | | | 701/431 |
| 2009/0109061 | A1 | 4/2009 | McNew et al. | |
| 2010/0082248 | A1* | 4/2010 | Dorum | G01C 21/32 |
| | | | | 701/533 |
| 2010/0100268 | A1* | 4/2010 | Zhang | B60W 30/09 |
| | | | | 701/25 |
| 2010/0228467 | A1* | 9/2010 | Wolfe | G08G 1/01 |
| | | | | 701/119 |
| 2011/0082623 | A1 | 4/2011 | Lu et al. | |
| 2013/0322634 | A1* | 12/2013 | Bennett | G10L 21/00 |
| | | | | 381/17 |
| 2014/0278052 | A1* | 9/2014 | Slavin | G01C 21/3492 |
| | | | | 701/400 |
| 2015/0203023 | A1* | 7/2015 | Marti | B60Q 1/00 |
| | | | | 340/425.5 |
| 2015/0258996 | A1* | 9/2015 | Victor | G09B 19/16 |
| | | | | 340/576 |
| 2015/0312404 | A1* | 10/2015 | Abramson | H04W 4/027 |
| | | | | 455/418 |
| 2016/0086285 | A1* | 3/2016 | Jordan Peters | G06Q 40/08 |
| | | | | 705/4 |
| 2018/0111611 | A1* | 4/2018 | MacNeille | B60Q 1/346 |
| 2018/0189578 | A1* | 7/2018 | Yang | G06T 17/00 |
| 2018/0365990 | A1* | 12/2018 | Suzuki | G08G 1/16 |
| 2019/0287397 | A1* | 9/2019 | Wiebel-Herboth | G08G 1/091 |

OTHER PUBLICATIONS

Response dated Nov. 13, 2017, to International Searching Authority International Search Report and Written Opinion dated Apr. 4, 2017, for International Application No. PCT/IB16/57546, Applicant, C.R. F. Società Consortile Per Azioni (12 pages).
Second International Preliminary Examining Authority Written Opinion dated Dec. 8, 2017, for International Application No. PCT/IB16/57546, Applicant, C.R.F. Società Consortile Per Azioni (7 pages).
Notification of Transmittal of International Preliminary Report on Patentability dated Mar. 27, 2018, for International Application No. PCT/IB16/57546, Applicant, C.R.F. Società Consortile Per Azioni, (8 pages).

\* cited by examiner

ASSISTING A MOTOR VEHICLE DRIVER IN NEGOTIATING A ROUNDABOUT

TECHNICAL FIELD OF INVENTION

The present invention relates to assisting a motor vehicle driver in negotiating a roundabout.

The present invention finds application in any type of road vehicles, both those used for transporting people, such as a passenger car, bus, camper, etc., and those used for transporting goods, such as an industrial vehicle (lorry, road train, articulated truck, etc.) or a light or medium-heavy commercial vehicle (van, truck with a covered body, chassis cab, etc.).

STATE OF THE ART

As is known, in recent years many car manufacturers have invested in research for Advanced Driver Assistance Systems (ADAS) for safety and better driving.

For this reason, ADAS is one of the most rapidly growing areas in the automotive field.

The safety characteristics of these systems are designed to avoid collisions and accidents by offering technologies that alert the driver of potential problems, or to avoid collisions by taking safety measures and taking control of the motor vehicle. Adaptive characteristics may automate the lighting, provide adaptive cruise control, automate braking, incorporate GPS/traffic signals, connect smartphones, warn the drivers of other motor vehicles of dangers, keep drivers in the right lane, or show what is hidden by blind angles.

ADAS technology is based on vision/camera systems, sensor systems, automotive data networks and vehicle-to-vehicle (V2V) or vehicle-to-infrastructure (V2I) communications systems.

Next generation ADAS systems shall increasingly exploit wireless connectivity to offer added value to vehicle-to-vehicle (V2V) or vehicle-to-infrastructure (V2I) communications.

Over the next ten years, ADAS systems are destined to become much more popular than they are today, because they will help to achieve the objectives set by the European Union for the reduction of road accidents over the ten-year period 2011-2020.

In fact, according to a research carried out by the Accident Research of the German Association of Insurers (GDV), lane-change warning systems on their own are able to prevent up to 15% of road accidents, while crossroad assistance can avoid up to 35% of accidents.

It is considered that technological developments, such as the integration of radar and cameras and the fusion of sensors between multiple applications, will cause a reduction in costs that could result in a more significant penetration of ADASes in the compact vehicle market by 2018.

By way of example, ADAS designed to provide assistance for negotiating road junctions are disclosed in US 2009/109061, DE 10 2012 208988 A1, US 2011/082623 A1 and JP H04 290200 A.

OBJECT AND ABSTRACT OF THE INVENTION

First of all, the Applicant has observed that the above-described prior art ADASes are designed to assist drivers in negotiating generic road junctions and none of them is specifically designed to assist drivers in approaching and negotiating a roundabout.

The Applicant has also observed that the ADAS described in US 2009/109061 A1 is based on vehicle-to-infrastructure communication to exchange information between vehicles and roadside units in charge of controlling the junctions, and therefore require an infrastructure that provides a roadside control unit at every junction.

Each roadside unit is designed to store a map, a geometry and traffic rules of the associated junction, to collect data, such as speed and position of the vehicles passing through the controlled junction, and to implement proprietary rule-based algorithms to determine priorities for crossing the junction.

The necessary information for the roadside unit can be received from the passing vehicles or from infrastructure sensors, but in the latter case the junction infrastructure must be appropriately sensorized with on-road or on-signpost sensors.

The roadside units communicate with vehicles to notify each vehicle of its priority for crossing the junction. The vehicles receive messages with the priorities defined by the roadside unit and alert the driver accordingly.

The Applicant has also observed that the ADAS disclosed in DE 10 2012 208988 A1 is aimed at identifying conflicts in the trajectories of vehicles equipped with vehicle-to-vehicle communications systems to determine whether or not the trajectories are in conflict.

In particular, vehicles exchange their current positions and also the expected (future) trajectories, in the form of GPS points, via vehicle-to-vehicle communications.

Identification of trajectory conflicts is based on estimates of the vehicle and trajectory boundaries (areas immediately around the vehicles and their trajectories), reconstructed by the vehicles according to the position and trajectory information received from the other vehicles on the basis of algorithms that allow estimating, in a rapid and precise manner, the exact point of potential impact (or point of trajectory conflict).

Activation of the ADAS requires that each vehicle be equipped with a vehicle-to-vehicle communications system and a specific software application that processes the information received from the other vehicles. This application, which computes the (future) trajectory of the host vehicle and sends it to the other vehicles (in the form of a sequence of GPS points) via vehicle-to-vehicle communications, must therefore be active on each vehicle.

The Applicant has also observed that the ADAS disclosed in US 2011/082623 A1 is generically applicable to junctions and uses on-board sensors, such as radar and lidar, to observe and monitor the surroundings in the immediate vicinity of vehicles (a few metres), and wherein GPS and digital maps are only used for determining the entry of vehicles at the junctions, while possible collisions between vehicles are determined using short-range sensors. In consequence, a collision can be identified when a vehicle entering a junction is within the visual range of the sensors of another vehicle. In other words, collisions are only identified when the vehicles involved are a few metres apart.

Finally, the Applicant has observed that the ADAS disclosed in JP H04 290200 A is generally applicable to junctions and represents a warning system for potential collision between vehicles approaching a junction from opposite directions.

Each vehicle communicates information, such as position, speed and direction, to nearby vehicles. Each vehicle is therefore equipped with a unit that determines the existence of a road junction, within a certain distance from the vehicle, by using the GPS position of the vehicle and a map. If the vehicle is close to a road junction, the system checks, via information received from nearby vehicles, if there are other vehicles approaching the junction within a corresponding period and from the opposite direction, this determining the existence of a potential conflict. If other vehicles are approaching the junction, warnings of a possible collision are displayed to the driver.

The object of the present invention is hence to provide a motor vehicle driver assistance system specifically designed to assist a motor vehicle driver in approaching and negotiating a roundabout.

According to the present invention, a motor vehicle driver assistance system to assist a motor vehicle driver in negotiating a roundabout is therefore provided, as claimed in the appended claims.

DETAILED DESCRIPTION OF PREFERRED EMBODIMENTS OF THE INVENTION

Figure 1:
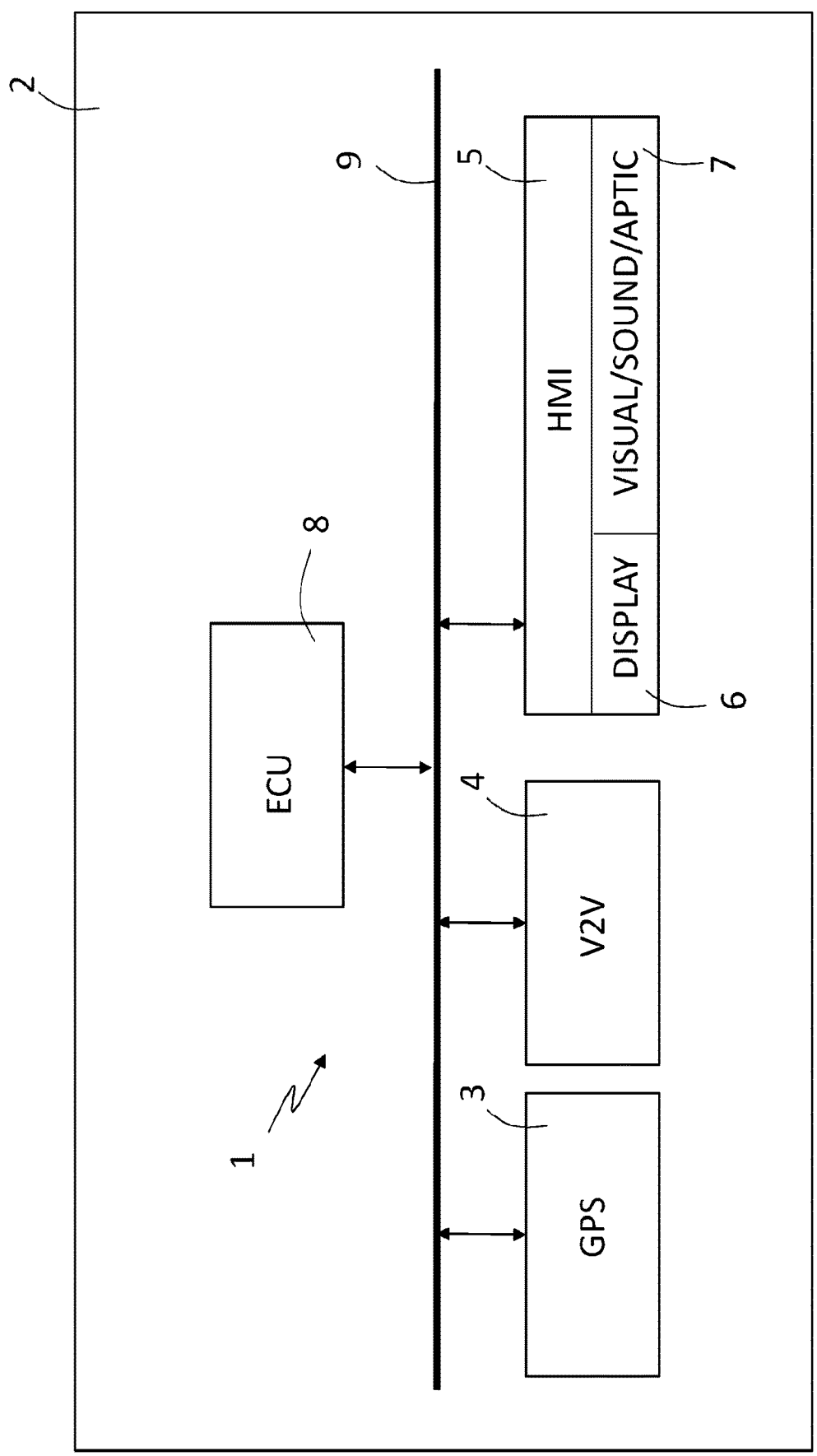
FIG. 1 shows a block diagram of an advanced driver assistance system to assist a motor vehicle driver during approach and negotiation of a roundabout, according to the present invention.

The present invention will now be described in detail with reference to the accompanying drawings to enable an expert in the field to embody it and use it. Various modifications to the described embodiments will be immediately obvious to experts in the field, and the generic principles described herein can be applied to other embodiments and applications without however departing from the scope of the present invention, as defined in the appended claims. Therefore, the present invention is not intended to be limited to the embodiments set forth herein, but is to be accorded the widest scope consistent with the principles and features disclosed and claimed herein.

In broad outline, motor vehicle driver assistance according to the present invention is essentially based on vehicle-to-vehicle (V2V) wireless communications, GNSS positioning and map-matching of digital maps for the purpose of establishing priorities at a roundabout junction and informing the driver in the event of a risk of collision and providing a priority indicator for negotiating the roundabout.

Threat assessment, i.e. evaluation of the risk of collision, is performed for each vehicle that arrives at a roundabout, on the basis of the system's own information and information received, by means of V2V communications, from neighbour vehicles that are within the communications range (experiments reveal a range of 150-300 m).

The V2V messages used are beacon messages that each vehicle sends by default when V2V communications are active and which contain information on the position, speed, acceleration, direction, etc. of the vehicle.

The V2V messages utilized are in conformity with current standard specifications ETSI ITS G5 in Europe and SAE J2735 DSRC in the USA, in particular the cooperative awareness messages (CAM, reference EN 302 637-2).

The information used by the advanced driver assistance system is the position, speed and acceleration of the vehicle.

In each vehicle, its own position and the position of all the neighbour vehicles are combined in an onboard map and the vehicles are classified on the basis of this combination according to their proximity to the roundabout (approaching, on, or driving away from roundabout).

Only vehicles approaching or on the roundabout in the same time slot (just before, just after) are considered and logged in a priority evaluation list.

Roundabout entry priorities (i.e. which vehicle enters first) are computed locally on the basis the priority evaluation list.

The computation only considers adjacent map links and junction nodes, avoiding complex e-Horizon calculations, and only considers a simple law of motion based on the current position and on that estimated on the map in the immediate neighbourhood, speed, direction and acceleration.

The feasibility of the advanced driver assistance system fails to depend on proprietary maps and may be implemented in OpenStreetMap.

Three types of signal are provided, in a manner similar to a set of traffic lights: "Red" indicates a course potentially in conflict and, therefore, the need to slow down and stop to give way; "Yellow" indicates a course potentially in conflict, with the possibility of continuing by having right of way for a brief period of time; "White" simply indicates the presence of a roundabout further on. The provision of a "White" signal is motivated by the uncertainty deriving from a possible absence of communication, which might also be due to the presence of non-communicating, but potentially conflicting vehicles. By merging V2V communications with on-board sensors, the system might detect non-communicating vehicles and provide a "Green" in the event of no vehicles being detected.

These warnings correspond to a set of conditions that could be supplied to the advanced driver assistance system for the longitudinal control of the motor vehicle, for example by acting on the brakes of the motor vehicle or on the engine speed.

The value of the proposed system lies in the relative simplicity of implementation. In fact, it is solely a vehicle-only based system and therefore does not require roadside units or other local elements installed at roundabout junctions. For this reason, the proposed system can be extended to crossroad junctions.

Moreover, the relative simplicity of the mechanism ensures computational symmetry for every vehicle (no additional sensor on specific vehicles needs to be provided), thereby reducing risks of signalling discrepancy to a minimum, or rather providing conflicting warnings in different vehicles due to different ways of threat evaluation.

The advanced driver assistance system (ADAS) according to the present invention will now be described in greater detail with reference to the accompanying drawings.

In particular, in FIG. 1, reference numeral 1 indicates, as a whole, an advanced driver assistance system specifically designed to provide assistance to a driver of a motor vehicle 2 for negotiating a roundabout, according to the present invention.

The driver assistance system 1 essentially comprises:

an on-board location device 3, conveniently of a satellite type;

a vehicle-integrated vehicle-to-vehicle (V2V) communications system 4, hereinafter referred to as V2V communications system;

an automotive human-machine interface 5 comprising, amongst other things, an electronic graphical display device 6 and, optionally, a visual and/or sound and/or haptic electronic signalling device 7; and an electronic control unit 8 connected to the on-board location device 3, to the V2V communications system 4 and to the automotive human-machine interface 5 via an automotive on-board communication network 9, for example CAN, FlexRay or others, to:

receive and process:
  motor-vehicle position-related data of the motor vehicle 2, hereinafter referred to as host motor vehicle HMV, provided by the on-board location device 3, and of motor vehicles present in the communication range of the V2V communications system 4, hereinafter referred to as neighbour motor vehicles NMV, provided by the V2V communications system 4, as described in greater detail below; and motor-vehicle motion-related data of the host motor vehicle HMV received via the automotive on-board communication network 9, such as the driving speed, the gear engaged, the positions of the accelerator pedal and the brake pedal, etc., and of the neighbour motor vehicles NMV received via the V2V communications system 4, as shall be described in greater detail below; and provide the driver, via the automotive human-machine interface 5, with motor vehicle driving information to assist the driver in approaching and negotiating the roundabout, as well as, if necessary, acting on the principal automotive controls, for example, braking and engine speed, in the manner described in detail below.

The V2V communications system 4 is known in itself and for this reason shall only be described in relation to the characteristics necessary to understand the present invention.

In particular, it is sufficient here to say that the V2V communications system belongs, together with the vehicle-to-infrastructure (V2I) communications systems, to the broader category of vehicle-to-everything (V2X) communications systems. The V2V communications system 4 is a short-range two-way wireless communications system that complies with the ETSI ITS G5 standard in Europe and SAE J2735 DSRC standard in the USA for Cooperative Awareness Basic Service EN 301 637-2. In particular, the V2V communications system 4 can be operated to automatically detect and identify other V2V communications systems within its communication range and to communicate with the detected V2V communications systems. In order to do this, the V2V communications system 4 autonomously and periodically generates, encodes and broadcasts standard beacon messages, so-called cooperative awareness messages (CAM), which contain information on the position, speed, acceleration and direction of the motor vehicle on which it is mounted.

The electronic control unit 8 is programmed to execute motor vehicle driver assistance software that, when executed, causes the electronic control unit 8 to become configured to implement the operations described below, with reference to the flow charts shown in FIGS. 3-6.

Figure 2:
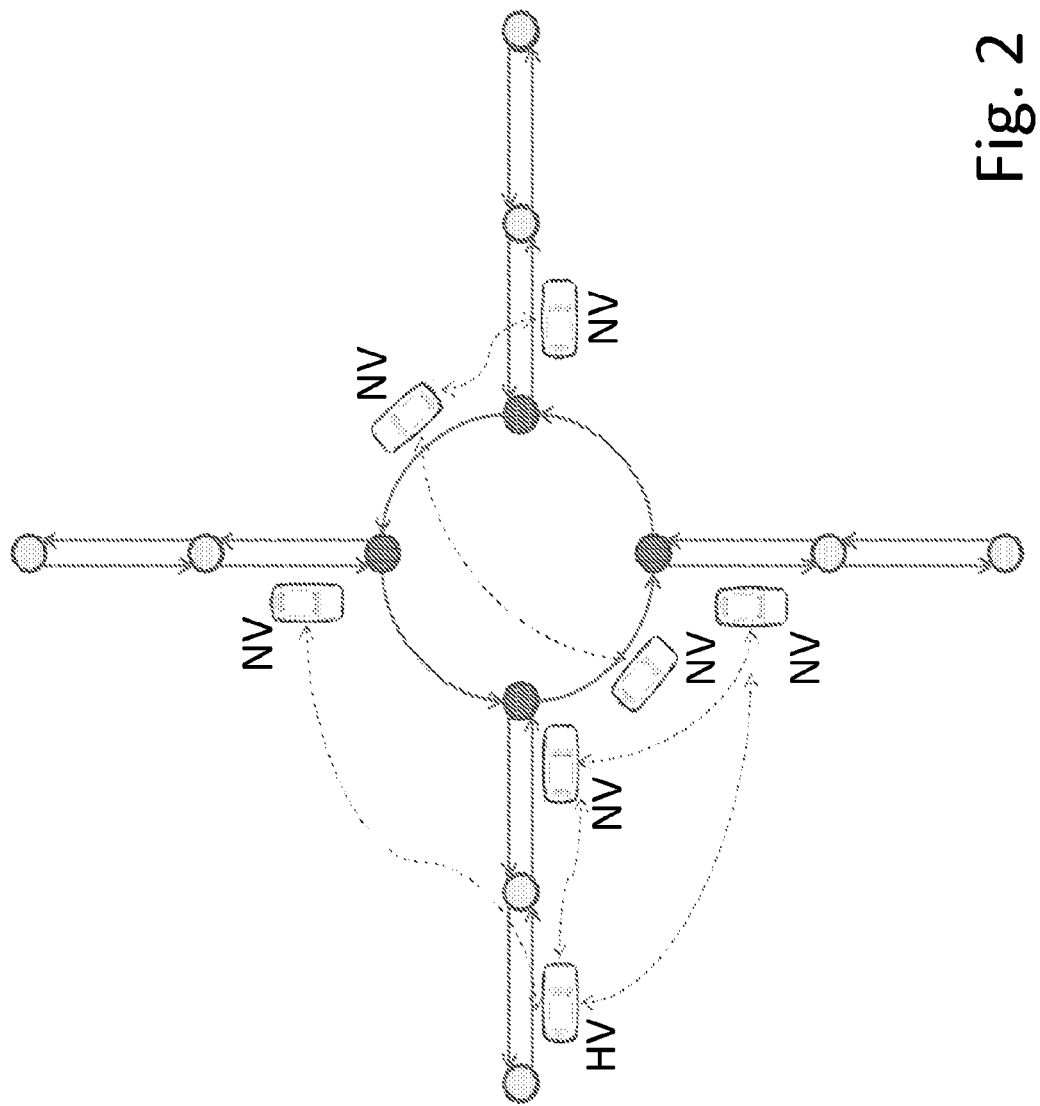
FIG. 2 shows a schematic representation of a driving situation in which a motor vehicle is approaching a roundabout.

In particular, the motor vehicle driver assistance software is designed to ensure that the driver of the host motor vehicle HMV is assisted in a driving situation of the type schematically show in FIG. 2, in which neighbour motor vehicles NMV are approaching a roundabout and others are negotiating it, in order to increase the driving safety of all the motor vehicles involved.

Figure 3:
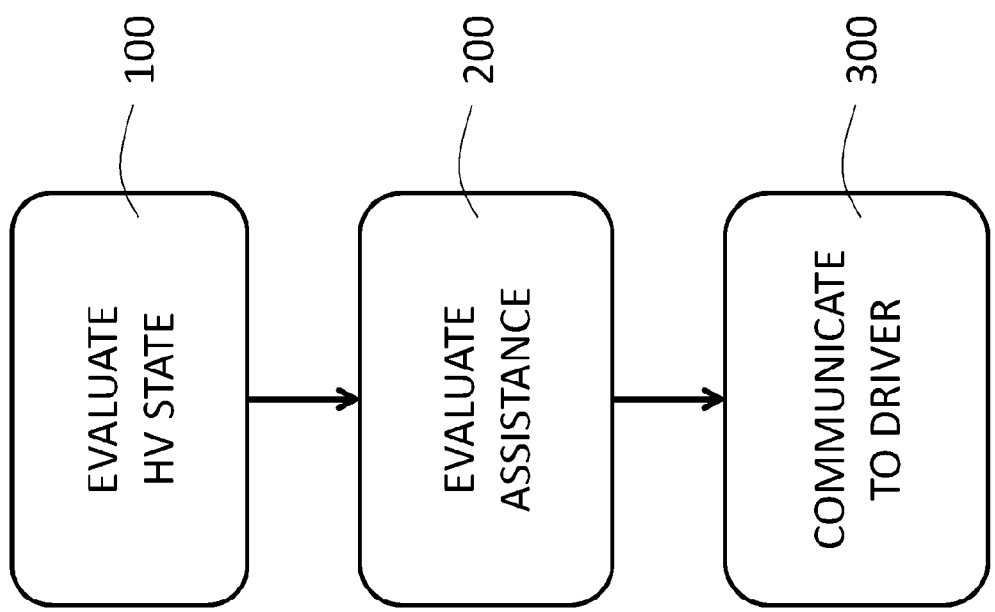
FIGS. 3-7 show flow charts of operations performed by the advanced driver assistance system during negotiation of a roundabout.

FIG. 3 shows a flowchart of the operating principle of the advanced driver assistance system 1 of the present invention.

As shown in FIG. 3, the advanced driver assistance system 1 is designed to implement three main functions:

determine a degree of proximity of the host motor vehicle HMV to the roundabout on the basis of the position-related data of the host motor vehicle, in order to discriminate between whether the host motor vehicle HMV is approaching the roundabout, is negotiating the roundabout or if there is no roundabout in the vicinity of the host motor vehicle HMV (block 100);

evaluate assistance to give the driver of the host motor vehicle HMV on the basis of the degree of proximity of the host motor vehicle HMV to the roundabout and the motion-related data of the host motor vehicle HMV and of the neighbour motor vehicles NMV (block 200); and communicate to the driver through the man-machine interface 5 to provide the driver with the evaluated assistance (block 300).

Figure 4:
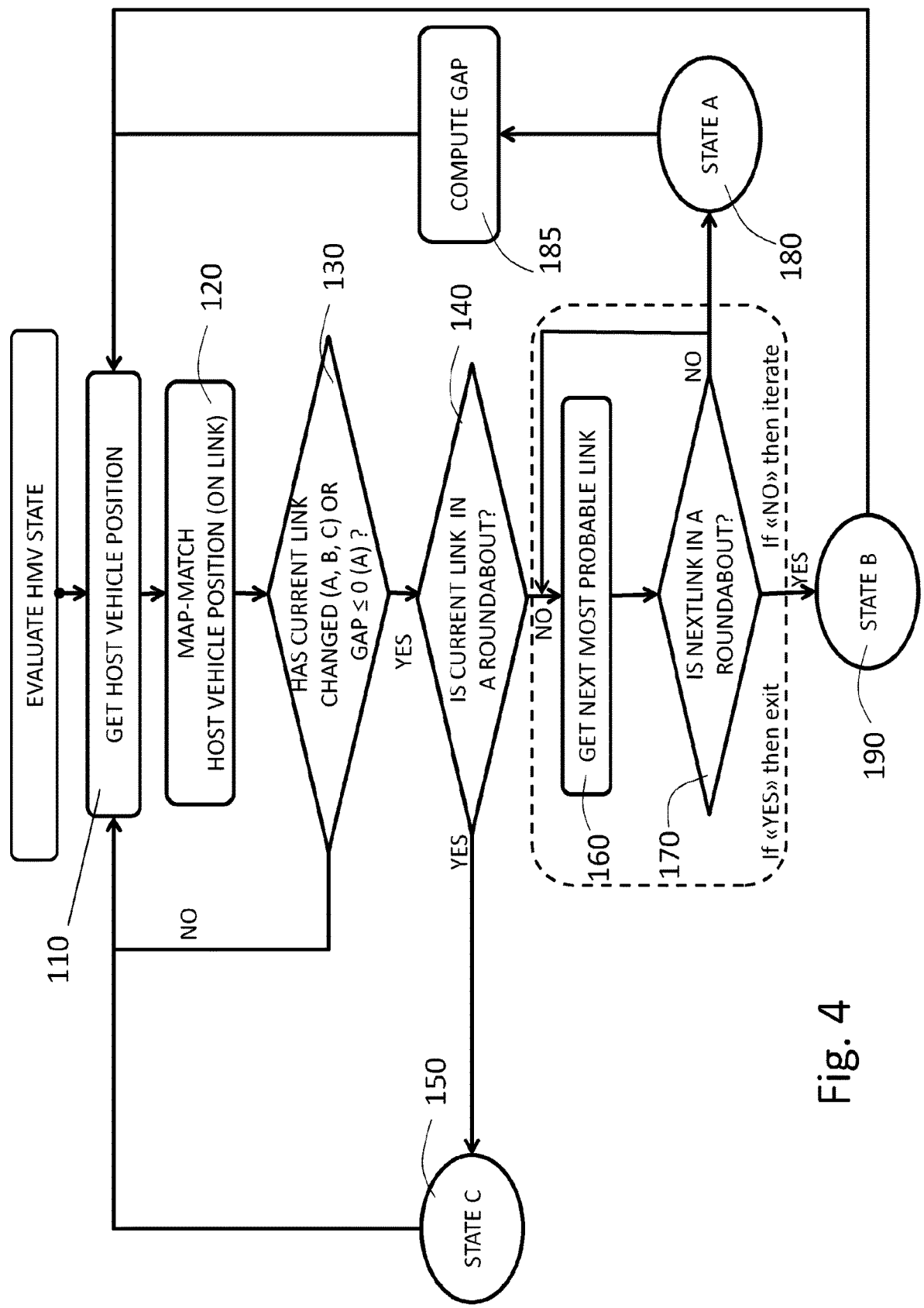
Figure 9:
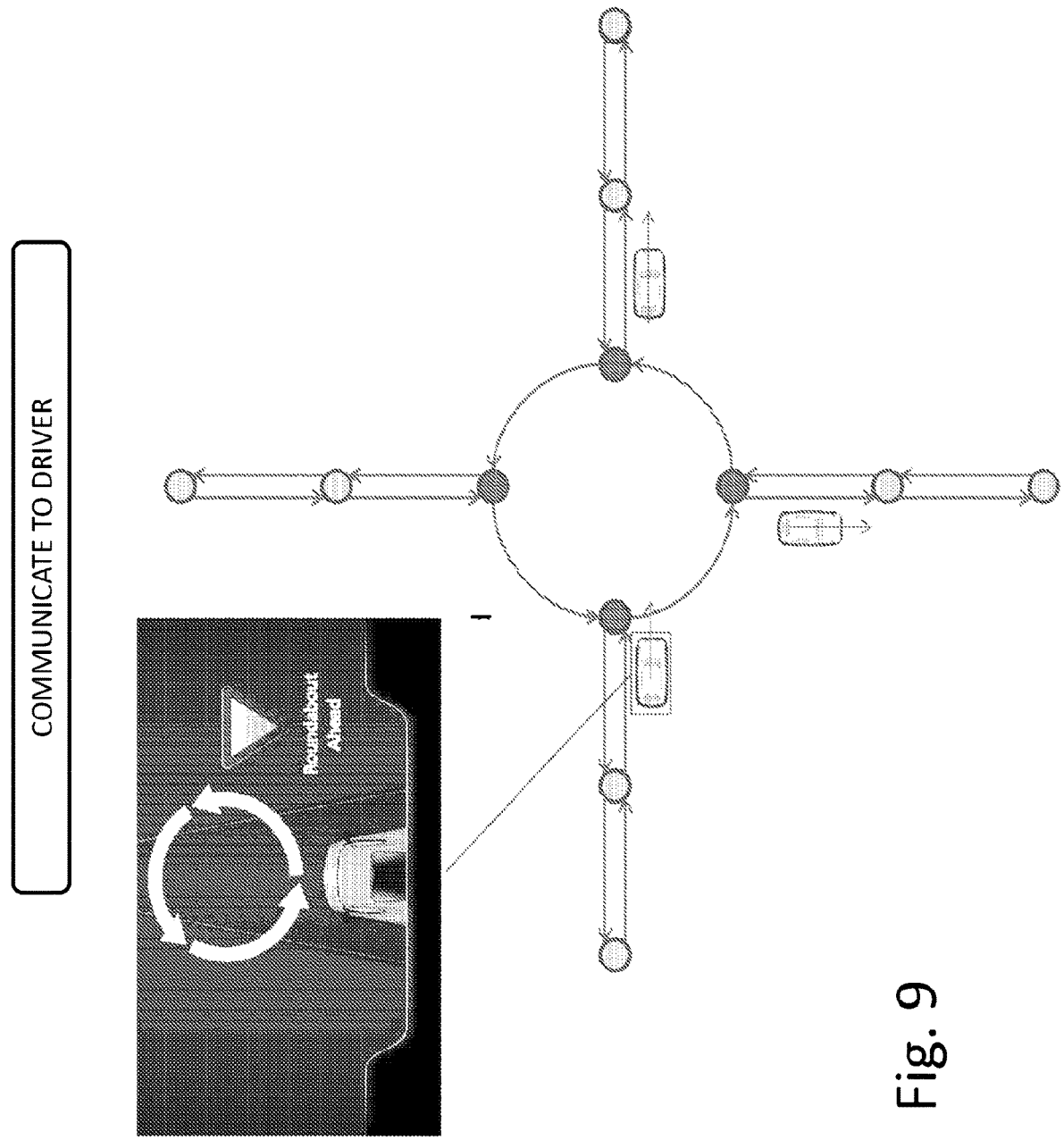

FIG. 4 shows a flowchart of the state evaluation step for the host motor vehicle HMV, which essentially envisages the following operations:

determine a current position of the host motor vehicle HMV (block 110), find a current link on a digital road map corresponding to the current position of the host motor vehicle HMV and the driving direction on the link (block 120). This can be conveniently achieved by implementing a digital map matching algorithm, which, as is known, is a correlation algorithm for two sets of geographical positional information, which, in this case, are constituted by the geographic position data provided by the onboard location device 3 and by a digital road map that is stored in the electronic control unit 8 and that, as is known, is the digital representation of a road network made by means of sets of nodes and links that connect the nodes;

check if the current link has changed or if the gap, a quantity that shall be described further on, is equal to or less than zero (block 130);

if the check is negative, operations are resumed from that described in block 110;

if the check is positive, check if the current link is in a roundabout (block 140);

if the check is positive, determine that the host motor vehicle HMV is negotiating a roundabout, this being a vehicle state that is graphically represented in the flowchart by block 150, labelled as "State C", and consequently inform the driver of the host motor vehicle HMV appropriately, opportunely via the electronic graphical display device 6, which can be controlled to place itself in an idle condition in which, for example, a graphical representation of a roundabout, for example of the type shown in FIG. 9, is displayed, but with only the central symbol of the roundabout shown, without further information at the side;

if the check is negative, iterate the following operations until a given exit condition from the iteration described below occurs:
  determine the next most probable link in the digital road map (block 160);
  check if the next most probable link is in a roundabout (block 170);
  if the check is negative, repeat the operations in blocks 160 and 170 for the next most probable links, indicated hereinafter as j'th links, i.e. determining the j+1'th next most probable link to the previously considered j'th link and checking whether the j+1'th next most probable link is in a roundabout, until j assumes a specific value, indicated as n and described below, i.e. until j=n, which represents the iteration exit condition and ensures that the operations in blocks 160 and 170 are repeated up to the n+1'th next most probable link to that currently being driven along by the host motor vehicle HMV. Regarding the value of n, this is such that the maximum distance calculated along the links from the current position of the host motor vehicle HMV up to the end of the n+1'th link is less than or at most equal to a predetermined threshold distance. In an urban scenario, where the roundabouts are signposted by give-way signs located approximately 150 m before the roundabouts, the threshold distance could reasonably be in the order of 150-200 m, which corresponds to a number of links ranging from 3 to 5 (block 170);
  furthermore, in the case where the j+1'th next most probable link is not in a roundabout, in addition to repeating the operations in blocks 160 and 170, determine that the host motor vehicle HMV will not enter a roundabout within the predetermined threshold distance, this condition corresponding to a vehicle state that is graphically represented in the flowchart by block 180, labelled as "State A", and thus evaluate the assistance to give the driver in this vehicle state, which essentially contemplates consequently informing the driver of the host motor vehicle HMV appropriately, opportunely via the electronic graphical display device 6, which can be controlled to place itself in an idle condition in which the graphical representation shown in FIG. 8 is displayed. In this vehicle state, the gap between the end of the n+1'th link and the above-mentioned threshold distance (which by definition is a positive value that decreases as the host motor vehicle HMV is driven along) (block 185) is also computed and then operations are resumed from that described in block 110. This ensures that as long as the gap has a positive value and the j+1'th next most probable link is not in a roundabout, the host motor vehicle HMV will remain in State A, with consequent updating of the current position of the host motor vehicle HMV (block 110), map matching (block 120) and recalculation of the gap (block 185), while when the gap reaches a zero or negative value, the n+2'th next most probable link is taken into consideration and checked to see if it is in a roundabout; and
  instead, in the case where the j+1'th next most probable link is in a roundabout, determine that the host motor vehicle HMV will enter the roundabout after having driven a distance that is calculated from the current position of the host motor vehicle HMV to the start of the j'th link, i.e. that it will enter the roundabout within or just beyond the predetermined threshold distance, this condition corresponding to a vehicle state that is graphically represented in the flowchart block 190, labelled as "State B". Afterwards, the assistance to give the driver in this vehicle state is evaluated, this operation being described in greater detail below with reference to the flowchart shown in FIG. 7, and operations are resumed from that described in block 110.

Figure 5:
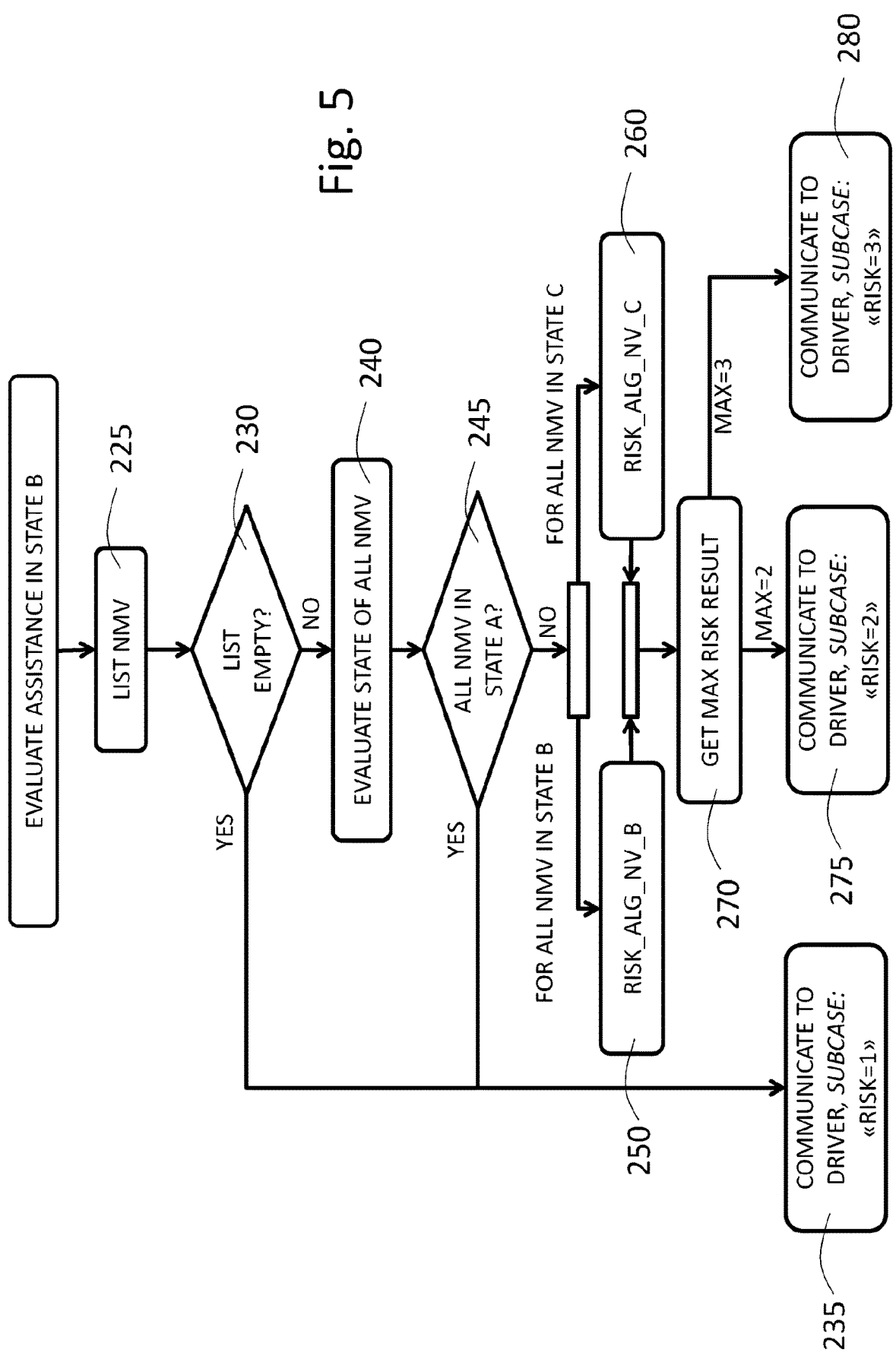
Figure 6:
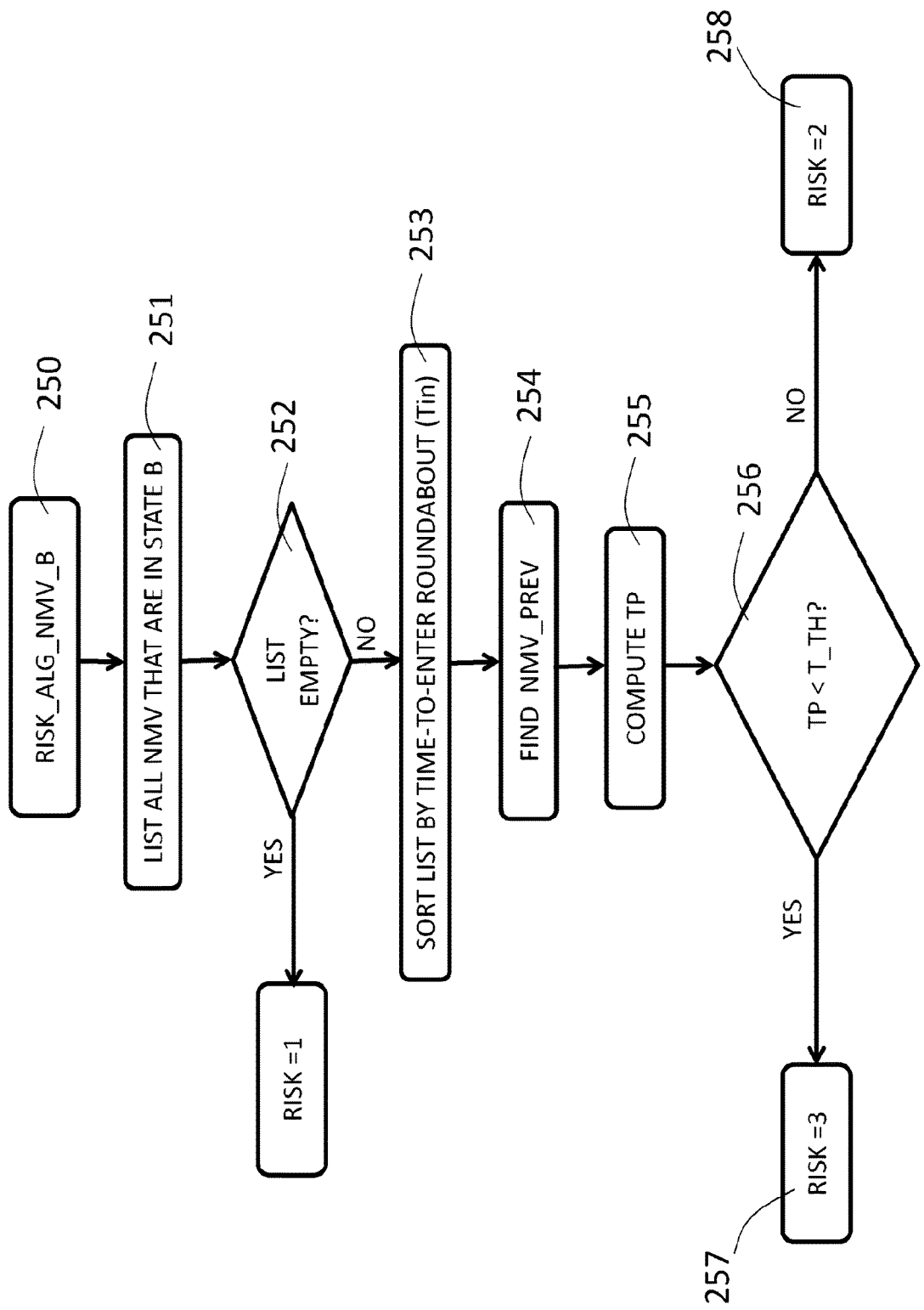
Figure 7:
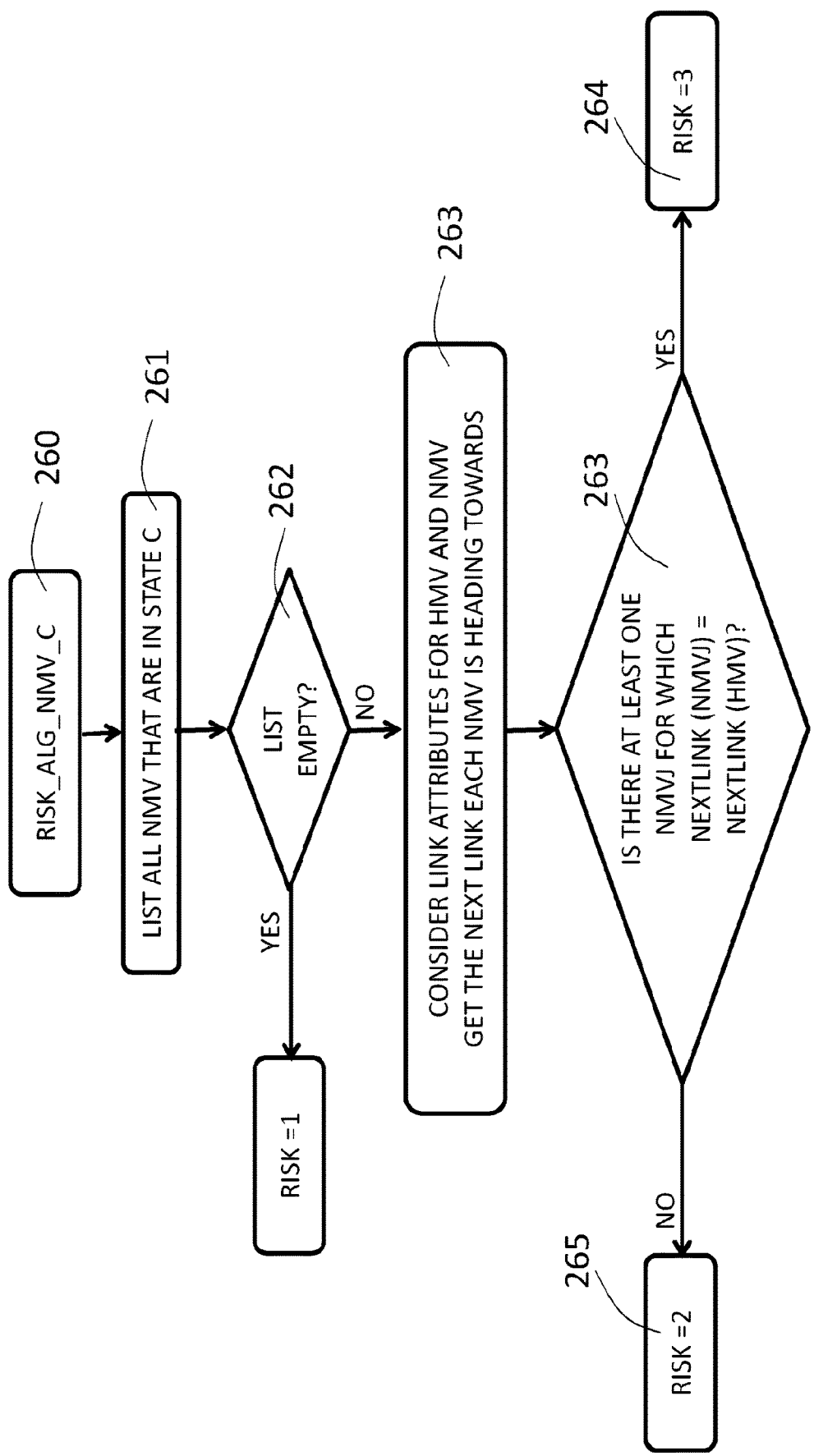
Figure 8:
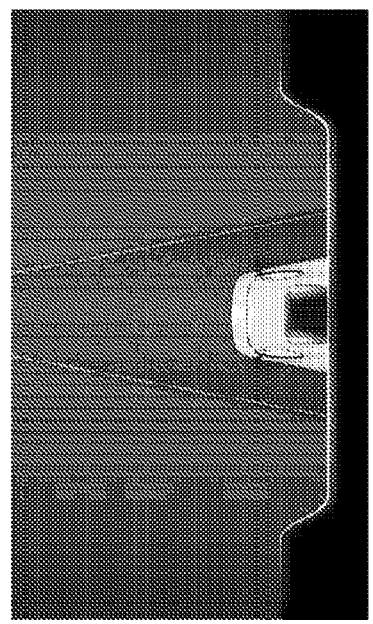
FIGS. 8-11 show schematic representations of situations in which the advanced driver assistance system provides the motor vehicle driver with assistance in negotiating a roundabout and possible graphical representations that can be viewed on an electronic automotive display in these situations.

FIG. 5 shows a flow chart of the evaluation step of the assistance to give the driver when the host motor vehicle HMV is in state B, which essentially envisages the following operations:
  create a list of the neighbour motor vehicles NMV on the basis of the cooperative awareness messages CAM received through the V2V communications system 4, this list corresponding to the so-called "V2X neighbour table" contemplated by the aforementioned standard regarding V2X communications systems (block 225);
  check if the list of the neighbour motor vehicles NMV is empty (block 230);
  if the check is positive, i.e. there are no neighbour motor vehicles NMV near the host motor vehicle HMV, determine a low alert level associated with the negotiation of the roundabout by the host motor vehicle HMV and consequently inform the driver of the host motor vehicle HMV appropriately, opportunely via the electronic display device 6, on which, for example, the schematic graphical representation of the type shown in FIG. 9 could be displayed (block 235);
  if the check is negative, i.e. there are neighbour motor vehicles NMV near the host motor vehicle HMV, determine the degree of proximity to the neighbour motor vehicles NMV to the same roundabout, in the same way as previously described with reference to the flow chart shown in FIG. 4, in which the degree of proximity of the host motor vehicle HMV to the roundabout is determined (block 240);
  then check if all the neighbour motor vehicles NMV are in the previously described state A, i.e. they do not enter the same roundabout that the host motor vehicle HMV will enter within or just beyond the predetermined threshold distance (block 245);
  if the check is positive, i.e. none of the neighbour motor vehicles NMV will enter the same roundabout that the host motor vehicle HMV will negotiate within or just beyond the predetermined threshold distance, determine a low alert level associated with the negotiation of the roundabout by the host motor vehicle HMV and consequently inform the driver of the host motor vehicle HMV appropriately, opportunely via the electronic display device 6, on which, for example, the same schematic graphical representation shown in FIG. 9 could be displayed (block 235);
  if the check is negative, i.e. the neighbour motor vehicles NMV are either in state B, that is to say they will enter the same roundabout that the host motor vehicle HMV will enter within or just beyond the predetermined threshold distance, or in state C, that is to say they are already negotiating the roundabout, use two alert level evaluation algorithms for the negotiation of the roundabout by the host motor vehicle, differentiated for neighbour motor vehicles NMV that are in state B and for neighbour motor vehicles NMV that are in state C, which shall be described in greater detail below with reference to the flow charts shown in FIGS. 6 and 7

Figure 10:
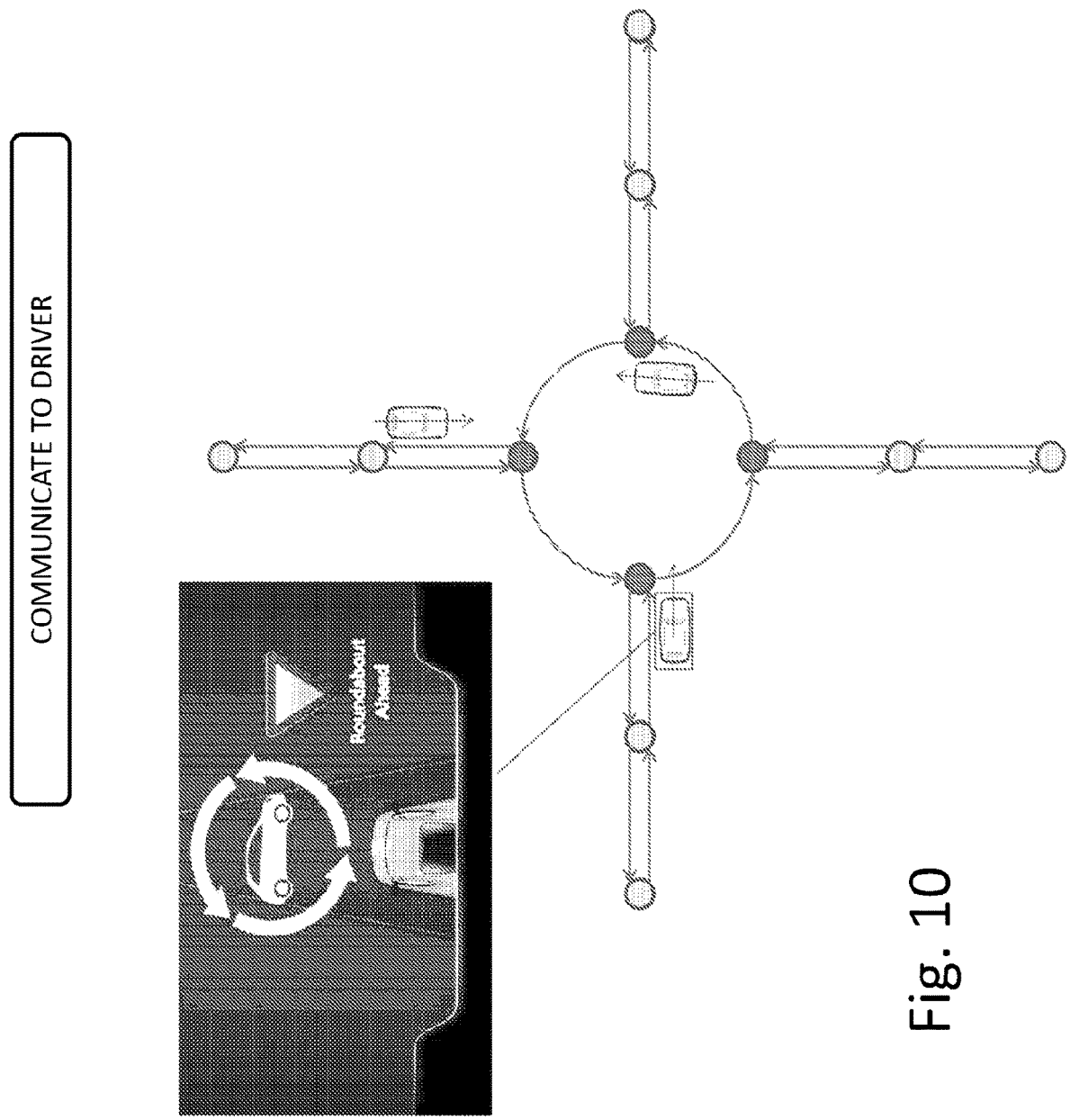
Figure 11:
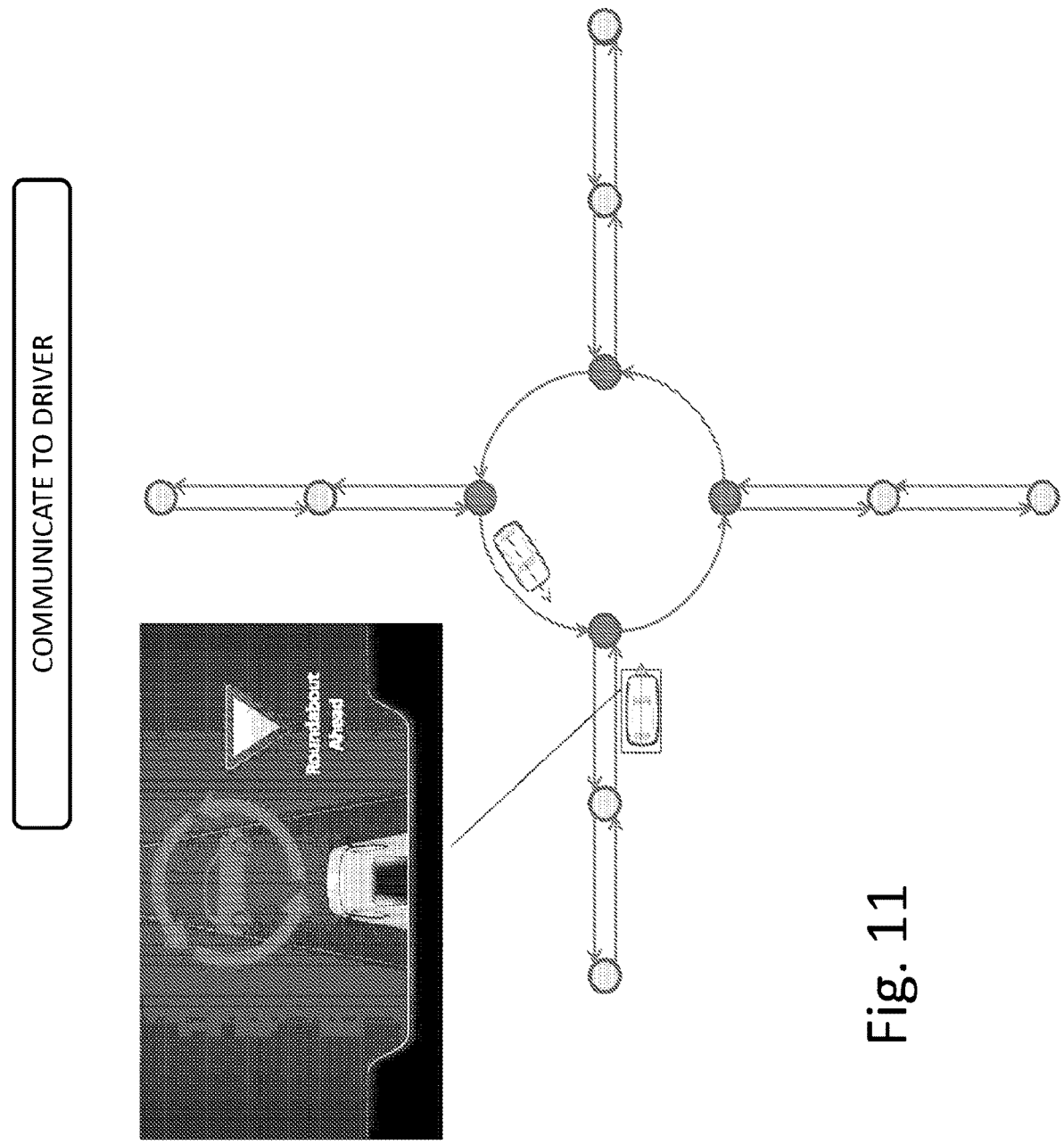

(blocks 250 and 260), and each of which returns a medium or high alert level;

determine the highest alert level of the two alert levels returned by the two different algorithms (block 270);

if the highest alert level is a medium alert level, consequently inform the driver of the host motor vehicle HMV appropriately, opportunely via the electronic display device 6, on which, for example, the schematic graphical representation shown in FIG. 10 could be displayed (block 275);

if the determined highest alert level is a high alert level, consequently inform the driver of the host motor vehicle HMV appropriately, opportunely via the electronic display device, on which, for example, the schematic graphical representation shown in FIG. 11 could be displayed (block 280).

FIG. 6 shows a flow chart of the algorithm for determining the alert level associated with neighbour motor vehicles NMV entering the roundabout that are in state B, i.e. neighbour motor vehicles NMV that will enter the same roundabout that the host motor vehicle HMV will also negotiate within or just beyond the predetermined threshold distance, the flow chart of which essentially envisages the following operations:

create a list L of just the neighbour motor vehicles NMV that are in state B and the first link of which in the roundabout is different from that of the host motor vehicle HMV. In this way, the list L includes motor vehicles that enter the same roundabout from different links. Neighbour motor vehicles NMV having the first link in the roundabout equal to that of the host motor vehicle HMV are excluded from the list L because these neighbour motor vehicles NMV typically correspond to motor vehicles that precede or follow host motor vehicle HMV on the same road entering the roundabout, and are not to be considered as the driver is already aware of their presence (block 251);

if the list L is empty, determine a low alert level (block 252);

if the list L is not empty, compute the times to enter the roundabout Tin of the neighbour motor vehicles NMV present on the list L and then order the list L according to the roundabout times-to-enter Tin (block 253);

identify the vehicle in the list of neighbour motor vehicles NMV, hereinafter indicated as the previous neighbour motor vehicle NMV_Prev for brevity, that will enter the roundabout just before the host motor vehicle HMV (block 254);

compute the roundabout time-to-enter margin TP between the roundabout time-to-enter of the host motor vehicle HMV and of the previous neighbour motor vehicle NMV_Prev (block 255), according to the formula:

$$TP=Tin(HV)-Tin(NV\_Prev)$$

compare the roundabout time-to-enter margin TP with a threshold T_Th, which is indicative of fact that it is estimated that the previous neighbour motor vehicle NMV_Prev will enter the roundabout sufficiently in advance of the host motor vehicle HV to distinguish between the cases, and related risk, of transiting too close in the roundabout with respect to transiting sufficiently distanced in terms of time (block 256); and if the roundabout time-to-enter margin TP is below the threshold T_Th, determine a high alert level (block 257), otherwise determine a medium alert level (block 258).

FIG. 7 shows a flow chart of the algorithm for determining the alert level associated with entering the roundabout with neighbour motor vehicles NMV that are in state C, i.e. that are already negotiating the roundabout that will also be negotiated by the host motor vehicle HMV, which envisages the following operations:

create a list M of just the neighbour motor vehicles NMV that are in state C (block 261);

if the list M is empty, determine a low alert level (block 262);

consider the geographical attributes of the starts and ends of the links that the neighbour motor vehicles NMV and the host motor vehicle HMV are driving along and identify the end points, in the driving direction, of the current links on which the neighbour motor vehicles NMV are moving (block 263);

check if the end point of at least one of the current links of an identified neighbour motor vehicle NMV coincides with the end point of the current link being driven along by the host motor vehicle HMV and previously computed by means of map matching (block 264);

if the check is positive, determine a high alert level (block 264), otherwise determine a medium alert level (block 265).

The two algorithms described above can be improved by "rescaling" the determined alert level when the host motor vehicle HMV is above a threshold distance $D_{warning}$ from the roundabout, typically 50 m. In this situation, the low alert level actually remains the same, while the medium and high alert levels can be reduced to low and medium alert levels, respectively.

At a display level on the electronic graphical display device 6, in the case where within a same state, in this case in State B, the alert level is subjected to a new evaluation resulting in a higher level than the previous one, this shall cause the immediate display of the higher alert level. Otherwise, or rather in the case where within a same state, the alert level is instead subjected to an evaluation giving a lower level that the previous one, the lower alert level is only displayed at the end of the period of permanence of the currently displayed alert level, which could, for example, be 3-5 seconds. Instead, a change in the vehicle state cancels any type of display related to the previous vehicle state, restoring the default display shown in FIG. 8.

The two algorithms described above can be further improved by using additional vehicle data such as, for example, that indicative of the operational state of the direction indicators, which may be of help in the above-described computations or enable alternative alert level computations in relation to neighbour motor vehicles NMV in state C. In fact, in this situation it is possible to consider not only the end point of the current links but also those of the next most probable links, in such a manner as to consider neighbour motor vehicles NMV that are already negotiating the roundabout but are still distant from the host motor vehicle HMV, so as to estimate with greater confidence whether these neighbour motor vehicles NMV shall enter into conflict with the host motor vehicle HMV in the roundabout or if they will turn off and therefore their courses will not interfere with that of the host motor vehicle HMV.

Based on the above, the differences and advantages of present invention with respect to the initially described ADAS systems of the known art are evident.

First of all, the initially described ADAS systems of the known art generically concern road junctions and none of them is specifically designed and optimized to assist a driver in the approach and in the negotiation of roundabouts, as in the ADAS system according to the present invention.

Furthermore, with respect to the ADAS disclosed in US 2009/109061 A1, the ADAS system according to the present invention is an ADAS system based solely on vehicle-to-vehicle communications and does not require any infrastructure on the road with roadside units able to unilaterally control and decide junction the crossing priorities, subsequently communicated to the vehicles.

In the ADAS according to the present invention, there is no central unit (roadside unit) that evaluates the situation, takes unilateral decisions and then alerts all the vehicles, but a distributed type of approach in which each vehicle performs its own computations and establishes priorities coherently with the others, but independently from them.

In this distributed approach, each vehicle decides the behaviour to adopt based on its computations and provides the driver with indications without waiting for priorities from roadside units, which is extra information to be exchanged.

With respect to the ADAS disclosed in DE 10 2012 208988 A1, the object of which is to determine points of conflict between the trajectories of two vehicles, the object of the ADAS system according to the present invention is to identify the negotiation priorities for roundabouts and suggest the behaviour to adopt in order to increase the free flow of traffic and traffic safety.

To achieve these different objects, the information that the two ADASes exchange between vehicles is different, or rather positions and trajectories in the ADAS disclosed in DE 10 2012 208988 A1 and positions and speeds in the ADAS system according to the present invention, where each vehicle positions itself and the other neighbour motor vehicles on its own digital map.

Furthermore, in the ADAS according to the present invention, the roundabout negotiation priorities are managed on the basis of information regarding the approach to the roundabout. The reference is therefore the digital representation of the roundabout and its access branches (via map matching) and not the trajectory of the vehicles with respect to one another.

Furthermore, in the ADAS according to the present invention, the host motor vehicle predicts the sequence of links on the digital map that the vehicles will travel over based on kinematic parameters. There is no determination of the exact point of potential impact, but the identification of the access priority of the motor vehicles involved to a link (arc) of the roundabout on the map.

The ADAS according to the present invention only required that each motor vehicle be equipped with a vehicle-to-vehicle communications system (according to the ETSI ITS G5 standard in Europa and SAE J2735 DSRC standard in the USA) and that at least the host motor vehicle is equipped with a specific application that implements the function that processes the information received from the other motor vehicles. The ADAS system shall thus be active on the host motor vehicle even if the application is not present on the other motor vehicles. This is possible due to the fact that the application only uses information already exchanged by motor vehicles that implement vehicle-to-vehicle communications according to the ETSI ITS G5 and SAE J2735 DSRC standards.

Compared to the ADAS disclosed in US 2011/082623 A1, in the ADAS according to the present invention the vehicle-to-vehicle communications introduces the clear advantage of being able to identify the existence of possible positional conflicts between motor vehicles well in advance with respect to that achievable with the ADAS disclosed in US 2011/082623 A1. Furthermore, the use of vehicle-to-vehicle communications enables cutting back on the adoption of short-range onboard sensors.

In the ADAS according to the present invention, the vehicle-to-vehicle communications are used to enable motor vehicles to exchange information at large distances (hundreds of metres); in this way, motor vehicles can observe and monitor a wider portion of their surrounding environment.

The ADAS according to the present invention fails to use on-board sensors such as radar and lidar, the latter in particular being very expensive and not present on all motor vehicles.

In the ADAS according to the present invention, the GPS and the maps are tools enabling the identification of possible collisions between vehicles. In other words, the ADAS according to the present invention evaluates the position of the motor vehicles and the geometric links of the roads that they are travelling on to determine the existence of potential conflicts. Possible collisions are determined by estimating the future positions of the vehicles based on the information exchanged via vehicle-to-vehicle communications (current positions and speeds). In other words, possible future position conflicts can be determined when the vehicles involved are hundreds of metres apart.

With respect to the ADAS disclosed in JP H04 290200 A, the object of which is to determine trajectory conflicts, the object of the ADAS according to the present invention is to identify the negotiation priorities of a roundabout and suggest the behaviour to adopt, for example, how to adapt the speed to be adopted in order to generate efficient and free-flowing traffic.

In particular, the ADAS according to the present invention determines the negotiation priorities and suggests the behaviour to adopt (for example, the speed to keep) to have fluid and free-flowing traffic, i.e. to manage the priorities on a same map link so that vehicles travel over it successively without having traffic hold-ups and maintaining safety conditions.

Unlike the ADAS disclosed in JP H04 290200 A, in the ADAS according to the present invention, the position of the motor vehicles and the digital road map are used to classify the motor vehicles based on their position with respect to the roundabouts. Actions or different behaviour will be suggested to the drivers of the motor vehicles on the basis of this classification.

The suggestions that the ADAS according to the present invention provides the driver are based on the computation of more detailed information: the roundabout crossing priority of the vehicles that are negotiating it or shall negotiate it, and the warnings supplied to the driver do not only signal the existence of a possible conflict, but suggest the behaviour to adopt.

Finally, with respect to many prior art ADASes, in order for them to operate on the host motor vehicle, the ADAS according to the present invention fails to need the other motor vehicles to be equipped with a similar technology, for instance, because they are motor vehicles of other makes/types or because proprietary or premium technologies are used, but only requires that the other motor vehicles are equipped with vehicle-to-vehicle communication systems.

The invention claimed is:

1. An advanced driver assistance system to be provided on board a host motor vehicle (HMV) to assist a driver of the host motor vehicle (HMV) in negotiating a roundabout, wherein the advanced driver assistance system comprises:

an on-board location device adapted to output motor
vehicle position-related data of the host motor vehicle
(HMV);
a vehicle-to-vehicle communications system disposed in
the host motor vehicle (HMV) and adapted to automatically detect, identify and communicate with
vehicle-to-vehicle communications systems within a
communications range of the host motor vehicle
(HMV) and disposed in neighbor motor vehicles
(NMV) to exchange motor vehicle position-related data
and motor vehicle motion-related data;
an automotive human-machine interface adapted to provide the driver of the host motor vehicle (HMV) with
driving information to assist the driver in approaching
and negotiating the roundabout; and
an electronic control unit disposed in the host motor
vehicle (HMV) and connected to the on-board location
device, to the vehicle-to-vehicle communications system, and to the automotive human-machine interface
via an automotive on-board communication network
and adapted to:
receive and process the motor vehicle position-related and
motion-related data of the host motor vehicle (HMV)
and of the neighbor motor vehicles (NMV) to:
determine the neighbor motor vehicles (NMV) that will
enter the roundabout based on the motor vehicle
position-related data of the host motor vehicle
(HMV) and of the neighbor motor vehicles (NMV)
and a digital road map, and
provide the driver of the host motor vehicle (HMV), via
the automotive human-machine interface, with driving information to assist the driver in approaching
and negotiating the roundabout;
wherein the advanced driver assistance system is further
adapted to:
determine a degree of proximity to the roundabout of the
host motor vehicle (HMV) based on motor vehicle
position-related data of the host motor vehicle (HMV);
determine assistance to be provided to the driver of the
host motor vehicle (HMV) based on the degree of
proximity of the host motor vehicle (HMV) to the
roundabout and on the motor vehicle motion-related
data of the host motor vehicle (HMV) and on the motor
vehicle position-related and motion-related data of the
neighbor motor vehicles (NMV); and
communicate to the driver of the host motor vehicle
(HMV) to provide the determined assistance;
wherein determining assistance to be provided to the
driver of the host motor vehicle (HMV) comprises:
when it is determined that the host motor vehicle (HMV)
will enter the roundabout within a predetermined
threshold distance, determining the degrees of proximity to the roundabout of the neighbor motor vehicles
(NMV) that will enter the roundabout; and
determining an alert level associated with the negotiation
of the roundabout by the host motor vehicle (HMV)
based on the degrees of proximity to the roundabout
and the motion-related data of the host motor vehicle
(HMV) and of the neighbor motor vehicles (NMV) that
will enter the roundabout;
and wherein providing assistance to the driver of the host
motor vehicle (NMV) comprises:
providing the driver of the host motor vehicle (HMV)
with an indication of the determined alert level associated with the negotiation of the roundabout by the
host motor vehicle (HMV) through the automotive
human-machine interface.

2. The advanced driver assistance system of claim 1,
wherein determining a degree of proximity of a motor
vehicle to the roundabout comprises:
finding on the digital road map a current link corresponding to the current position of the motor vehicle;
checking if the current link is in a roundabout;
if the check is positive, determining that the motor vehicle
is negotiating a roundabout; and
if the check is negative, reiterating the following operations until a given exit condition from the iteration
occurs:
determining the next most probable link on the digital
road map;
checking if the next most probable link is in a roundabout;
if the check is positive, determining that the motor vehicle
will enter the roundabout within a threshold distance;
and
if the check is negative, repeating the two preceding steps
of determining and checking steps and, in addition,
determining that the motor vehicle will not enter the
roundabout within the threshold distance.

3. The advanced driver assistance system of claim 2,
wherein determining a roundabout travelling-related alert
level for the host motor vehicle (HMV) comprises:
creating a list of the neighbor motor vehicles (NMV) that
will enter the same roundabout as the one that will be
entered by the host motor vehicle (HMV);
determining a first alert level associated with the negotiation of the roundabout by the host motor vehicle
(HMV) when it is determined that there are no neighbor
motor vehicles (NMV) on the list or that all of the
neighbor motor vehicles (NMV) on the list will enter
the roundabout beyond a threshold distance;
when it is determined that there are neighbor motor
vehicles (NMV) on the list, determining the degrees of
proximity to the roundabout of the neighbor motor
vehicles (NMV); and
when it is determined that not all of the neighbor motor
vehicles (NMV) on the list will enter the roundabout
beyond a threshold distance, determining a second alert
level, higher than the first alert level, for the negotiation
of the roundabout by the host motor vehicle (HMV).

4. The advanced driver assistance system of claim 3,
wherein determining a second alert level associated with the
negotiation of the roundabout by the host motor vehicle
(HMV) comprises:
determining a third alert level associated with the negotiation of the roundabout by the host motor vehicle
(HMV) in relation to only the neighbor motor vehicles
(NMV) on the list for which it is determined that they
will enter the roundabout within a threshold distance;
determining a fourth alert level associated with the negotiation of the roundabout by the host motor vehicle
(HMV) in relation to only the neighbor motor vehicles
(NMV) for which it is determined that they are already
negotiating the roundabout; and
determining the second alert level as the highest of the
third and the fourth alert levels.

5. The advanced driver assistance system of claim 4,
wherein determining a third alert level associated with the
negotiation of the roundabout by the host motor vehicle
(HMV) in relation to only the neighbor motor vehicles
(NMV) on the list for which it is determined that they will
enter the roundabout within a threshold distance comprises:
creating a list (L) of only neighbor motor vehicles (NMV)
for which it is determined that they will enter the
roundabout within a threshold distance and whose first link on the digital map of the roundabout is different from that of the host motor vehicle (HMV);

determining the first alert level associated with the negotiation of the roundabout by the host motor vehicle (HMV) when it is determined that there are no neighbor motor vehicles (NMV) on the list (L);

when it is determined that there are neighbour motor vehicles (NMV) on the list (L), computing the times to enter the roundabout (Tin) of the neighbor motor vehicles (NMV) and ordering the list according to the roundabout times-to-enter (Tin);

identifying a previous neighbor motor vehicle (NMV_Prev) in the ordered list of neighbor motor vehicles (NMV) for which it determined that it will enter the roundabout just before the host motor vehicle (HMV);

computing the roundabout time-to-enter margin (TP) between the roundabout times-to-enter of the host motor vehicle (HMV) and of the previous neighbor motor vehicle (NV_Prev);

comparing the roundabout time-to-enter margin (TP) with a threshold (T_Th); and determining the third alert level associated with the negotiation of the roundabout by the host motor vehicle (HMV) based on the outcome of the comparison.

6. The advanced driver assistance system of claim 5, wherein determining the third alert level associated with the negotiation of the roundabout by the host motor vehicle (HMV) based on the outcome of the comparison comprises:

assigning a higher value to the third alert level if the roundabout time-to-enter margin (TP) is lower the threshold (T_Th), and a lower value if the roundabout time-to-enter margin (TP) is equal to or greater than the threshold (T_Th).

7. The advanced driver assistance system of claim 4, wherein determining a fourth alert level associated with the negotiation of the roundabout by the host motor vehicle (HMV) in relation to only the neighbor motor vehicles (NMV) that have been determined as already negotiating the roundabout comprises:

creating a list (M) of the neighbor motor vehicles (NMV) that have been determined as already negotiating the roundabout;

determining the first alert level associated with the negotiation of the roundabout by the host motor vehicle (HMV) if it determined that there are no neighbor motor vehicles (NMV) on the list (M);

if there are neighbor motor vehicles (NMV) on the list (L), determining the end points on the digital road map, in the driving direction, of the current links that the neighbor motor vehicles (NMV) are negotiating;

checking if the end point of at least one of the identified links coincides with the end point of the link currently travelled by the host motor vehicle (HMV); and determining the fourth alert level associated with the negotiation of the roundabout by the host motor vehicle (HMV) based on the outcome of the comparison.

8. The advanced driver assistance system of claim 7, wherein determining the fourth alert level associated with the negotiation of the roundabout by the host motor vehicle (HMV) based on the outcome of the comparison comprises:

assigning a higher value to fourth alert level if an end point of at least one of the identified links coincides with the end point of the link currently travelled by host motor vehicle (HMV), and a lower value if no end point of at least one of the identified links coincides with the end point of the link currently travelled by host motor vehicle (HMV).

9. Software loadable in electronic processing means of an advanced driver assistance system and designed to cause, when executed, the advanced driver assistance system to become configured as claimed in claim 1.

* * * * *